Oct. 27, 1931. J. M. GILLOGLY 1,829,002
BALL SHAPER FOR NURSERYMEN
Filed Nov. 4, 1929
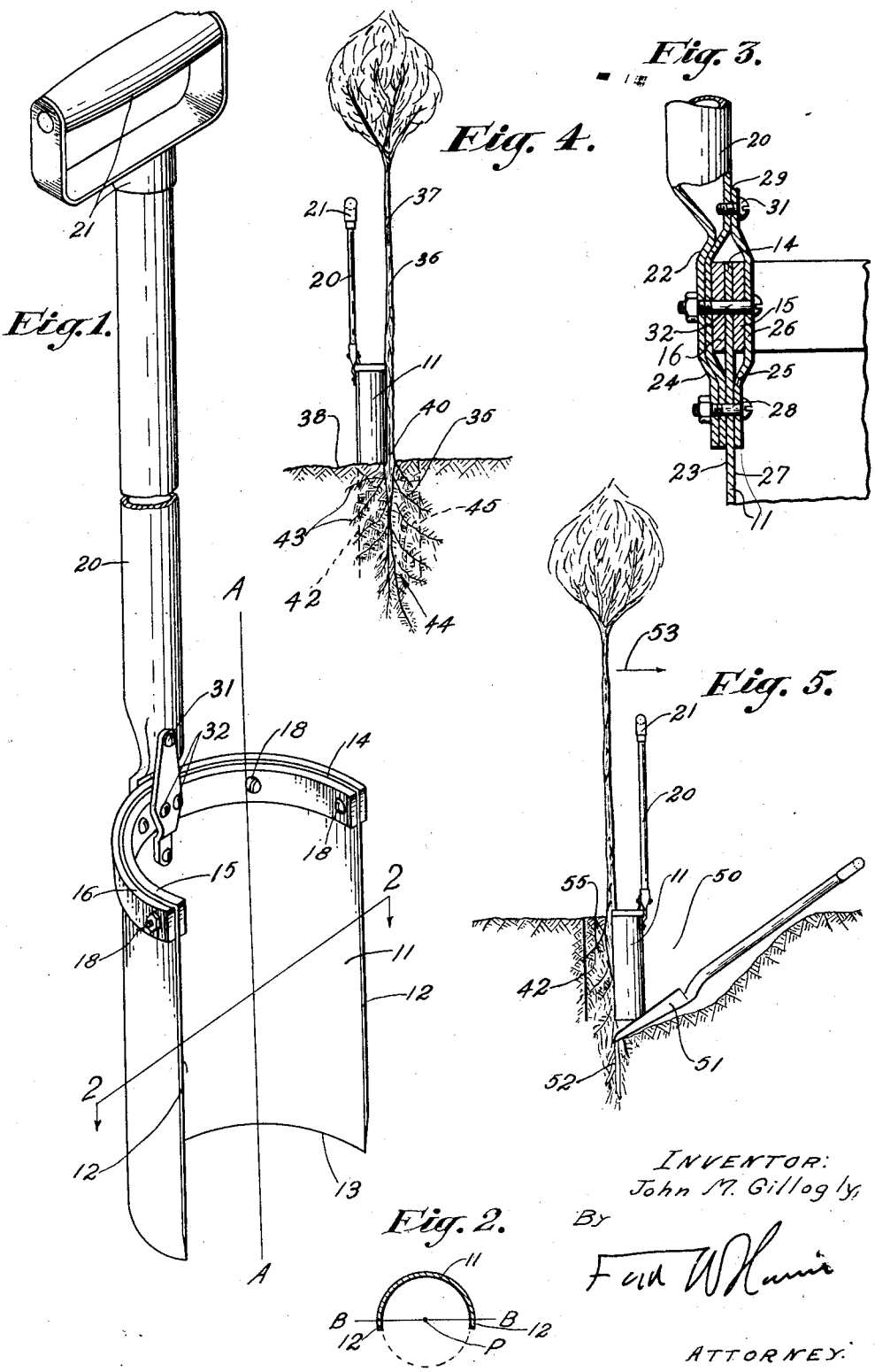
INVENTOR:
John M. Gillogly,
By
ATTORNEY.

Patented Oct. 27, 1931

1,829,002

UNITED STATES PATENT OFFICE

JOHN M. GILLOGLY, OF ORANGE, CALIFORNIA

BALL SHAPER FOR NURSERYMEN

Application filed November 4, 1929. Serial No. 404,618.

My invention relates to a device for properly cutting the soil or sod around the roots of a plant, such as a small tree or shrub, which is to be removed from the ground for the purpose of transportation or transplantation. In the horticultural arts it is now extensive practice to raise trees, shrubs, or other plants through an initial growth in nurseries where conditions for their proper care and growth are most satisfactory, these plants being removed from the soil and replanted in their permanent location after they have reached a desired stage of development in the nursery. In this transplantation process it is desirable to retain with the roots of the plant the body of soil in which the plant has grown from a slip or seed to a size suitable for transplantation. Some trees, such as avocado trees and others, positively require that the roots thereof be kept firmly embedded in earth during transplantation. For the root-embedding earth to become dislodged, in most cases, results in the death of the tree.

It is an object of my invention to provide a very simple tool which may be employed to form a perfect and undisturbed ball or body of soil or sod including the root formation of a young plant, making it possible to remove this ball from the ground and to retain such ball with the roots of the plant during transplantation, the device being of such simplicity and capable of such ease of perfect operation that loss of a plant due to improper formation of the ball is practically unknown where ordinary care is taken by the workmen.

A further object of the invention is to provide a ball shaper having a handle aligned in parallel relation with the axis of the blade thereof so that such handle will serve as a guide or aligning means in the placing of the blade and the forming of a ball on the roots of a plant.

A further object of the invention is to provide an implement of the above character having a cylindrical blade having a cross section slightly greater than a semicircle, and to provide means for reinforcing the upper edge of the blade so as to hold the blade to cylindrical form, thus making it possible to use a relatively light blade which may be forced into the soil around the roots of a plant with greatest facility.

A further object of the invention is to provide a tool of the above character having a blade which may be readily removed from its reinforcing means and handle so that another blade may be used with the reinforcing means and handle while the original blade is being sharpened.

Further objects and advantages of the invention will be made evident throughout the following part of the specification.

Referring to the drawings which is for illustrative purposes only,

Fig. 1 is a perspective elevational view showing my improved balling implement.

Fig. 2 is a horizontal cross section through the blade of the tool, this cross section being drawn to reduced scale.

Fig. 3 is an enlarged fragmentary cross section showing the means I have devised for attaching a simple form of handle to the blade of the implement in a simple yet effective manner.

Fig. 4 is a diagrammatic view illustrating the first step in the use of the implement.

Fig. 5 is a view similar to Fig. 4 showing another step in the use of the implement.

Referring to Fig. 1, my new balling tool includes a blade 11 of cylindrical form. As shown in Fig. 2, the blade 11 has a cross section slightly greater than a semicircle. In Fig. 2 the point P represents the axis on which the blade 11 is cylindrically generated, and the line B—B designates a vertical diametral plane, the blade 11 having vertical edges 12 which project beyond the diametral plane B—B. The vertical length of the blade 11 may be varied to suit conditions, it being preferable, however, to make the vertical length of the blade 11 two or three times the diametral width thereof. The lower end of the blade is sharpened to provide a circular, downwardly presented cutting edge 13, and the upper end 14 of the blade is reinforced by inner and outer curved or particylindrical reinforcing bars 15 and 16, the bar 15 being placed on the inside and the bar 16 being placed on the outside of the upper end portion 14, bolts 18 being extended through the reinforcing members 15 and 16 and the upper end portion 14 of the blade 11 for the purpose of filmly holding these parts together in such a manner that the blade 11 will be effectually reinforced by the reinforcing members 15 and 16. Centrally at the back of the upper portion of the blade 11 a handle 20 is secured in the manner shown in Figs. 1 and 3, this handle extending upwardly from the blade 11 in a position parallel with the axis A—A of the blade and having a clip 21 at its upper end. The handle 20 is preferably made from a metal tube and has its lower end 22 flattened and extended down over the rearward face of the reinforcing bar 16 to engagement with the rear face 23 of the blade 11, the flattened end 22 being bent in the manner shown in Fig. 3. Opposite the lower extremity 24 of the flattened end 22, the lower end 25 of a reinforcing bar 26 makes engagement with the inner face 27 of the blade 11, there being a bolt 28 extended through suitable openings provided in the blade 11 and in the lower ends 24 and 25 of the members 22 and 26. The reinforcing bar 26 bends outwardly and extends over the front face of the inner reinforcing member 15 to engagement at 29 with the handle 20, the upper end of the reinforcing bar being secured to the handle 20 by some suitable means such as indicated by a screw 31.

Bolts 32 are extended through the members 26, 15, 14, 16, and 22, as clearly shown, thus completing the means for detachably securing the handle 20 to the blade 11. An important feature of this new implement is the alignment of the handle 20 in parallel relation with respect to the axis A—A of the blade in order that the handle may serve in conjunction with the blade as a means for vertically aligning the blade 11 preparatory to forcing it into the soil around the roots 35 of a plant 36, as shown in Fig. 4. Should the stalk or small trunk 37 of the plant 36 be vertical, the handle 20 may be vary readily aligned with the trunk 37, as shown in Fig. 4.

The use of the device is substantially as follows: A plant to be transplanted or transported being selected, the tool is placed, as shown in Fig. 4, with the cutting edge 13 thereof resting on the soil 38 in such position that the semicircle defined by the edge 13 will be concentric with the lower portion 40 of the trunk 37. The proper positioning of the blade 11 may be understood from Fig. 2 in which it may be assumed that the point P represents the center of the lower end 40 of the trunk 37 and also the position of the axis A—A of the blade 11. It will be noted that the vertical edges 12 extend beyond the vertical plane B—B which cuts the point of concentricity of the lower portion 40 and the blade 11. With the tool in vertical position, as may be readily perceived from the handle 20 thereof, the blade 11 is then forced downwardly into the soil, as indicated by dotted lines 42, cutting off such small ends 43 of the roots 44 as may extend beyond the cylinder defined by the blade 11. The blade is then removed from the soil and moved around to a position diametrically opposite to that in which it is shown in Fig. 4, and a second cut 45 is then taken in cylindrical alignment with the original or first cut represented by the dotted lines 42. As shown in Fig. 5, the tool is left embedded in the hole when the second cut is made, and an excavation 50 is dug adjacent thereto in substantially the form indicated in Fig. 5, this excavation being a little wider than the diameter of the blade 11. The excavation 50 is carried deep enough to permit the forcing of a shovel blade 51 under the lower end of the blade 11 to cut off the tap root 52 adjacent to the lower end of the blade 11. When the tap root is in this manner cut, the plant and the handle 20 of the tool may be swung in the direction indicated by the arrow 53 in Fig. 5, and the cylindrical body of soil 55 embedding the roots 44 may be readily lifted from the ground, this cylindrical body 55 being termed in the nursery profession as "the ball."

After removal of a plant from the ground, the extreme lower end of the ball 55 is cut off square, and the ball is then wrapped with burlap, it then being ready for transportation to a new place of planting. By making the blade 11 with a cross-section as shown in Fig. 2, I am enabled to form a ball with two cuts or two placings of the blade 11 in the soil. The overlapping of these two cuts due to the extension of the vertical edges 12 of the blade 11 beyond the diametral plane B—B results in the cutting of a complete cylindrical body and in the cutting off of all small extending root ends 43, thus entirely freeing the body or ball 55 from the surrounding soil and eliminating possibility of part of the ball being pulled away or dislodged when it is lifted from the ground.

I claim as my invention:

1. A balling tool for nurseymen comprising: a thin semi-cylindrical blade having its lower edge adapted for earth cutting; a pair of circularly curved reinforcing bands secured one inside and one outside the upper edge of said blade; a relatively long handle extending upwardly from the back part of said blade in parallel alignment with the axis of said blade so that said handle is thereby adapted to use as an aligning means for said blade, said handle having its lower end flattened and extended down the back of said blade; a reinforcing bar extending from the upper portion of the inner face of said blade to the front part of said handle; and securing means extending through the lower flattened end of said handle, said blade, and said reinforcing bar so as to secure these members operatively together.

2. A balling tool for nurserymen comprising: a semi-cylindrical blade having its vertical edges projecting beyond a diametral plane and its lower edge adapted for earth cutting; a pair of circularly curved reinforcing bands secured one inside and one outside the upper edge of said blade; a relatively long handle extending upwardly from the back part of said blade, said handle having its lower end flattened and extended down the back of said blade; a reinforcing bar extending from the upper portion of the inner face of said blade to the front part of said handle; and securing means extending through the lower flattened end of said handle, said blade, and said reinforcing bar so as to secure these members operatively together, said securing means adapted to be readily detachable to permit the facile removal of said blade from said handle.

3. A balling tool for nurserymen comprising: a semi-cylindrical blade having its vertical edges projecting beyond a diametral plane and its lower edge adapted for earth cutting; a pair of circularly curved reinforcing bands secured one inside and one outside of the upper edge of said blade; a relatively long handle extending upwardly from the back part of said blade in parallel alignment with the axis of said blade so that said handle is thereby adapted to use as an aligning means for said blade, said handle having its lower end flattened and extending down the back of said blade; and means for detachably securing said handle to said blade.

4. A balling tool for nurserymen comprising: a semi-cylindrical blade having its lower edge adapted for earth cutting; a pair of circularly curved reinforcing bands secured one inside and one outside the upper edge of said blade; and a handle extending upwardly from the back part of said blade in parallel alignment with the axis of said blade so that said handle is thereby adapted to use as an aligning means for said blade, said handle having its lower end flattened and extended down the back of said blade.

In testimony whereof, I have hereunto set my hand at Los Angeles, California, this 31st day of October, 1929.

JOHN M. GILLOGLY.